(12) United States Patent
Fan et al.

(10) Patent No.: US 10,021,296 B2
(45) Date of Patent: Jul. 10, 2018

(54) AUTOMATIC ROTATABLE CAMERA FOR PANORAMA TAKING IN MOBILE TERMINALS

(71) Applicant: Futurewei Technologies Inc., Plano, TX (US)

(72) Inventors: Guangbin Fan, San Jose, CA (US); Hui Vicki Tan, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 244 days.

(21) Appl. No.: 14/145,709

(22) Filed: Dec. 31, 2013

(65) Prior Publication Data

US 2015/0189175 A1 Jul. 2, 2015

(51) Int. Cl.
*H04N 5/232* (2006.01)
*H04N 5/225* (2006.01)

(52) U.S. Cl.
CPC ....... *H04N 5/23238* (2013.01); *H04N 5/2251* (2013.01)

(58) Field of Classification Search
CPC ... H04N 5/23238; H04N 5/265; H04N 5/2251
USPC ......................... 348/36, 37, 222.1
See application file for complete search history.

(56) References Cited

U.S. PATENT DOCUMENTS

| | | | | |
|---|---|---|---|---|
| 4,576,432 A * | 3/1986 | Ruger | ..................... | F41G 3/165 250/214 VT |
| 6,975,353 B1 * | 12/2005 | Milinusic | ............. | G02B 26/101 348/218.1 |
| 7,782,375 B2 * | 8/2010 | Chambers | ............... | H04N 7/142 348/239 |
| 7,796,871 B2 * | 9/2010 | Park | ........................ | G03B 37/02 396/322 |
| 8,203,597 B2 * | 6/2012 | Wang | ..................... | G03B 37/00 348/36 |
| 8,860,818 B1 * | 10/2014 | Sachs | .................. | H04N 5/23216 348/180 |
| 9,213,220 B2 * | 12/2015 | Fowler | .................... | G03B 17/56 |
| 2005/0057656 A1 * | 3/2005 | Chardon | .............. | H04N 5/2252 348/207.99 |
| 2007/0009247 A1 * | 1/2007 | Maeda | .................... | G02B 7/102 396/72 |
| 2007/0085913 A1 * | 4/2007 | Ketelaars | ............... | H04N 5/232 348/239 |

(Continued)

FOREIGN PATENT DOCUMENTS

KR 100548403 B1 * 2/2006
KR 20080043563 A * 5/2008

*Primary Examiner* — Christopher S Kelley
*Assistant Examiner* — Kathleen Walsh
(74) *Attorney, Agent, or Firm* — Schwegman Lundberg & Woessner, P.A.

(57) ABSTRACT

A method and apparatus to create a panoramic image via a rotating camera of a portable electronic device are provided. The method includes rotating the camera of the portable electronic device with respect to the portable electronic device. The method further includes recording a plurality of images at a plurality of corresponding angles between the camera and a direction of the portable electronic device. The method further includes stitching the plurality of images together based on the plurality of angles and creating a panoramic image from the plurality of images.

15 Claims, 6 Drawing Sheets

(56) References Cited

U.S. PATENT DOCUMENTS

| | | | | |
|---|---|---|---|---|
| 2007/0263995 A1* | 11/2007 | Park | .................. | G03B 37/02 |
| | | | | 396/50 |
| 2010/0265313 A1* | 10/2010 | Liu | .................. | G06T 3/4038 |
| | | | | 348/36 |
| 2010/0284676 A1* | 11/2010 | Shintani | ............... | H04N 5/2354 |
| | | | | 396/175 |
| 2010/0328524 A1* | 12/2010 | Yoshizumi | ........... | H04N 5/2251 |
| | | | | 348/373 |
| 2011/0149015 A1* | 6/2011 | Lin | .................. | H04N 5/23222 |
| | | | | 348/36 |
| 2012/0195579 A1* | 8/2012 | Ho | .................. | G03B 17/12 |
| | | | | 396/74 |
| 2013/0329003 A1* | 12/2013 | Hsia | .................. | H04N 5/23238 |
| | | | | 348/36 |
| 2014/0168356 A1* | 6/2014 | Francois | ............ | H04N 5/23238 |
| | | | | 348/37 |
| 2015/0124047 A1* | 5/2015 | Yatziv | ................ | H04N 5/23293 |
| | | | | 348/37 |

* cited by examiner

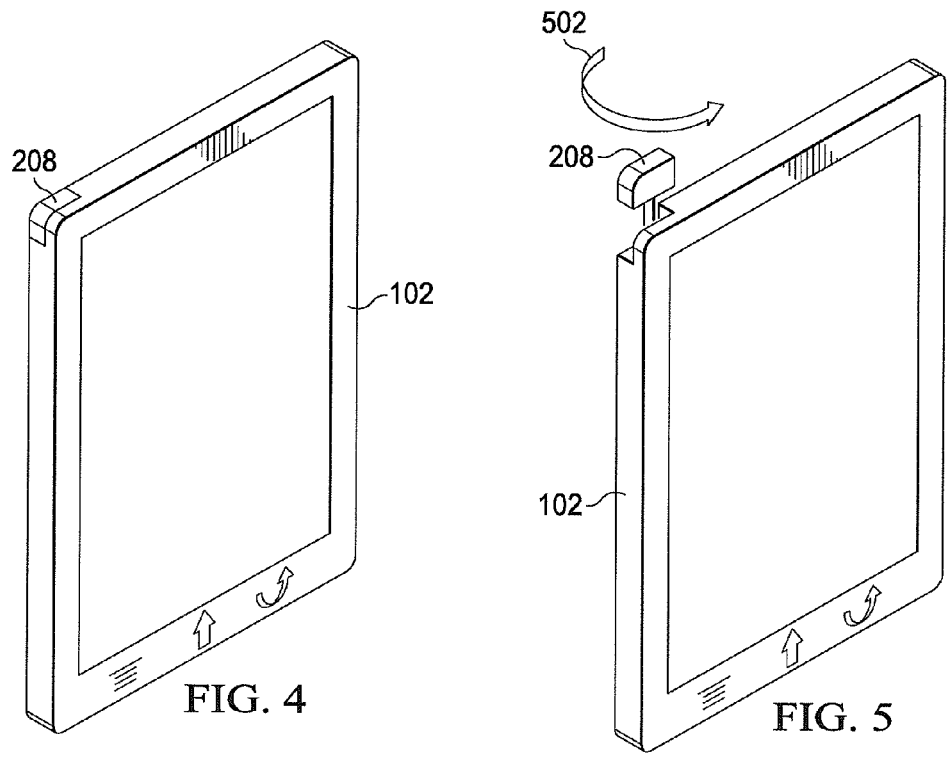
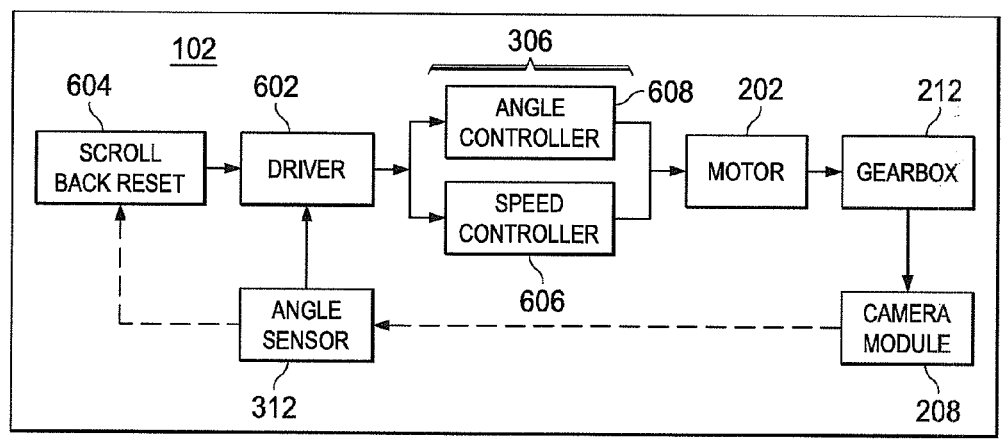

US 10,021,296 B2

AUTOMATIC ROTATABLE CAMERA FOR PANORAMA TAKING IN MOBILE TERMINALS

TECHNICAL FIELD

The present application relates generally to creating panoramic images, and more particularly, to a camera that is controllable for rotation by an application for taking multiple images and generating a panoramic image.

BACKGROUND

Panoramic images have a wide angle of view that can be wider than the angle of view of a camera of portable electronic devices or terminals, e.g., smart phone, tablets, computers, etc. Currently, to take a panoramic photograph, a user holds the device and moves it manually across the subject to take multiple pictures. Users take photos around themselves until they have covered the whole intended field of view with a series of photos.

The process is quite complex for a common user to operate, especially as the position of the electronic portable device can be unintentionally changed from time to time in addition to rotating the smart phone. Changing the position of the smart phone increases the difficulty of stitching of the photos together to make a panoramic image.

SUMMARY

According to one embodiment, there is provided a method to generate a panoramic image in an application on a rotating camera of a portable electronic device is provided. The method includes rotating the camera of the portable electronic device with respect to the portable electronic device. The method further includes recording a plurality of images at a corresponding plurality of angles between the camera and a direction of the portable electronic device. The method further includes stitching the plurality of images together based on the plurality of angles and creating a panoramic image from the plurality of images.

In another embodiment, an apparatus for creating a panoramic image is provided. The apparatus includes a camera that is rotatable with respect to the apparatus and is configured to record a plurality of images at a corresponding plurality of angles between the camera and a direction of the apparatus. The apparatus further includes one or more processors configured to stitch the plurality of images together based on the plurality of angles and create a panoramic image from the plurality of images.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4 and 5 illustrate an electronic device with a rotating camera module at an original position and an extended position, respectively, according to embodiments of the present disclosure;

FIG. 6 is a block diagram that illustrates certain components within an electronic device according to embodiments of the present disclosure;

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The present disclosure provides systems and methods of an automatic rotatable camera for taking panoramic images in mobile terminals. An extendable and retractable camera is associated with a motor and sensors that can be controlled by applications running on the mobile terminal. The application creates panoramic images by rotating the camera to or through a plurality of angles with respect to the mobile terminal while recording a plurality of images.

The present disclosure provides a solution for automatic panorama photo taking with automatic rotating camera design. A user holds the mobile terminal for a few seconds to let the camera rotate (e.g., 360 degrees or 270 degrees) to record and create a panoramic image. The rotation of the camera is controlled by a motor of the mobile terminal. The system hardware includes a retractable, rotatable and programmable camera for mobile terminals. A motor control unit and a sensor unit detect the positioning of the camera and angles relative to the camera, the mobile terminal, and a corresponding geographic location.

Figure 1:
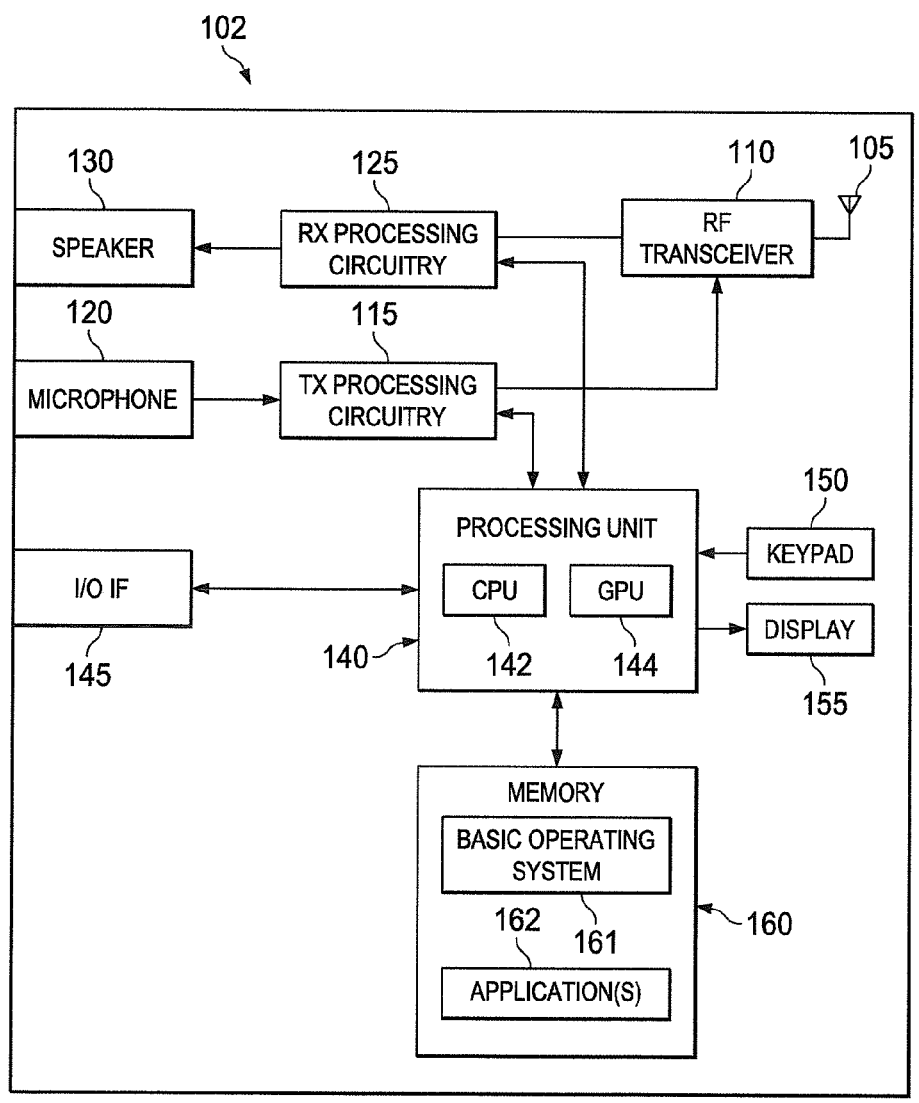
FIG. 1 illustrates an example electronic device according to embodiments of the present disclosure.

FIG. 1 illustrates an example electronic device 102 according to embodiments of the present disclosure. The embodiment of the electronic device 102 shown in FIG. 1 is for illustration only. Other embodiments of an electronic device could be used without departing from the scope of this disclosure.

The electronic device 102 includes an antenna 105, a radio frequency (RF) transceiver 110, transmit (TX) processing circuitry 115, a microphone 120, and receive (RX) processing circuitry 125. The electronic device 102 also includes a speaker 130, a processing unit 140, an input/output (I/O) interface (IF) 145, a keypad 150, a display 155, and a memory 160. The electronic device 102 could include any number of each of these components.

The processing unit 140 includes processing circuitry configured to execute instructions, such as instructions stored in the memory 160 or internally within the processing unit 140. The memory 160 includes a basic operating system (OS) program 161 and one or more applications 162. The electronic device 102 could represent any suitable device. In particular embodiments, the electronic device 102 represents a mobile telephone, smartphone, personal digital assistant, tablet computer, touchscreen computer, and the like. The electronic device 102 captures, creates, and displays panoramic images.

The RF transceiver 110 receives, from the antenna 105, an incoming RF signal transmitted by a base station or other device in a wireless network. The RF transceiver 110 down-converts the incoming RF signal to produce an intermediate frequency (IF) or baseband signal. The IF or baseband signal is sent to the RX processing circuitry 125, which produces a processed baseband signal (such as by filtering, decoding, and/or digitizing the baseband or IF signal). The RX processing circuitry 125 can provide the processed baseband signal to the speaker 130 (for voice data) or to the processing unit 140 for further processing (such as for web browsing or other data). The RF transceiver 110 could also be an infrared (IR) transceiver, and limitation to the type of transceiver is not to be inferred.

The TX processing circuitry 115 receives analog or digital voice data from the microphone 120 or other outgoing baseband data (such as web data, e-mail, or interactive video game data) from the processing unit 140. The TX processing circuitry 115 encodes, multiplexes, and/or digitizes the outgoing baseband data to produce a processed baseband or IF signal. The RF transceiver 110 receives the outgoing processed baseband or IF signal from the TX processing circuitry 115 and up-converts the baseband or IF signal to an RF signal that is transmitted via the antenna 105.

In some embodiments, the processing unit 140 includes one or more processors, such as a central processing unit (CPU) 142 and a graphics processing unit (GPU) 144, embodied in one or more discrete devices. In some embodiments, the CPU 142 and the GPU 144 are implemented as one or more integrated circuits disposed on one or more printed circuit boards. The memory 160 is coupled to the processing unit 140. In some embodiments, part of the memory 160 represents a random access memory (RAM), and another part of the memory 160 represents a Flash memory acting as a read-only memory (ROM).

In some embodiments, the memory 160 is a computer readable medium that stores program instructions to capture and create panoramic images. When the program instructions are executed by the processing unit 140, the program instructions cause one or more of the processing unit 140, the CPU 142, and the GPU 144 to execute various functions and programs in accordance with embodiments of this disclosure.

The processing unit 140 executes the basic OS program 161 stored in the memory 160 in order to control the overall operation of the electronic device 102. For example, the processing unit 140 can control the RF transceiver 110, the RX processing circuitry 125, and the TX processing circuitry 115 in accordance with well-known principles to control the reception of forward channel signals and the transmission of reverse channel signals.

The processing unit 140 is also capable of executing other processes and programs resident in the memory 160, such as operations for capturing, creating, and displaying panoramic images as described in more detail below. The processing unit 140 can also move data into or out of the memory 160 as required by an executing process. In some embodiments, the processing unit 140 is configured to execute one or more applications 162. The processing unit 140 can operate the application 162 based on the OS program 161 or in response to a signal received from a base station. The processing unit 140 is coupled to the I/O interface 145, which provides the electronic device 102 with the ability to connect to other devices, such as laptop computers, handheld computers, and server computers. The I/O interface 145 is the communication path between these accessories and the processing unit 140.

The processing unit 140 is also optionally coupled to the keypad 150 and the display unit 155. An operator of the electronic device 102 uses the keypad 150 to enter data into the electronic device 102. The display 155 may be a liquid crystal display, light emitting diode (LED) display, or other display capable of rendering text and/or at least limited graphics from web sites. The display unit 155 may be a touchscreen which displays the keypad 150. Alternate embodiments may use other types of input/output devices and displays.

Figure 2:
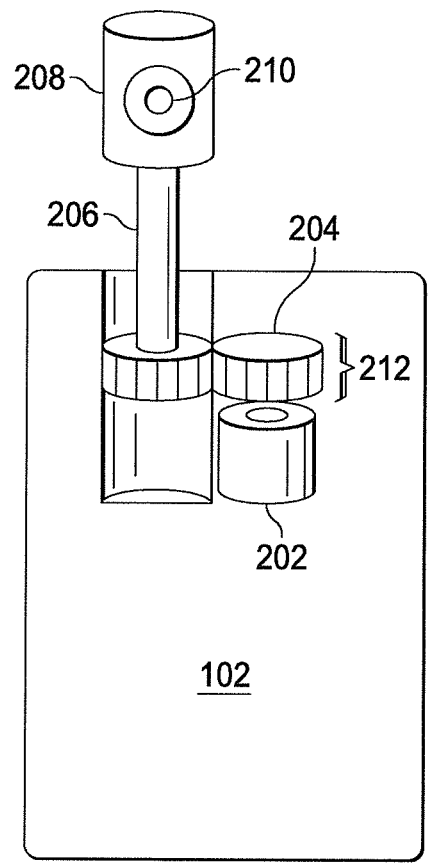
FIG. 2 is a diagram that illustrates certain components within an electronic device according to embodiments of the present disclosure.

FIG. 2 is a diagram that illustrates certain components within the electronic device 102 according to embodiments of the present disclosure. The embodiment of the electronic device 102 shown in FIG. 2 is for illustration only. Other embodiments of an electronic device could be used without departing from the scope of this disclosure.

The portion of electronic device 102 depicted in FIG. 2 illustrates additional components and relationships therebetween of the electronic device 102 of FIG. 1. The electronic device 102 includes a motor 202, one or more gears 204 within a gearbox 212, an extendable shaft 206, and a camera module 208.

Rotating camera module 208 can be extended from and retracted back into the electronic device 102. A viewing position/angle of the camera can be detected by one or more sensors associated with the motor 202, or calculated through the motor's movement positions.

The motor 202 is housed within the electronic device 102 and provides the driving force that allows the camera module 208 to rotate. The motor 202 is controlled by a camera controller, such as the camera controller 306 of FIG. 3. The motor 202 is connected to the extendable shaft 206 via the one or more gears 204 within the gearbox 212. The motor 202 can include one or more sensors and provide one or more outputs that indicate one or more of an angle, a speed, a position, a torque, and so on, of the motor 202.

The one or more gears 204 are within the gearbox 212 housed within the electronic device 102 and transfer torque from the motor 202 to the extendable shaft 206. The one or more gears 204 can adjust the amount and direction of torque from the motor 202 that is applied to the extendable shaft 206.

The extendable shaft 206 is housed within the electronic device 102 when the camera module 208 is not extended from the electronic device 102. The extendable shaft 206 is coupled to one or more of the gears 204 to receive torque from the motor 202.

The camera module 208 includes a camera and a camera lens 210. When extended from the electronic device 102 via the extendable shaft 206, the camera module 208 is used to record images that can be combined to form a panoramic image. The camera module 208 and its camera rotate via torque from the motor 202, which is coupled to the extendable shaft 206 via the one or more gears 204. In some embodiments, the camera module 208 optionally includes one or more processors configured to perform one or more of recording images and forming panoramic images.

Figure 3:
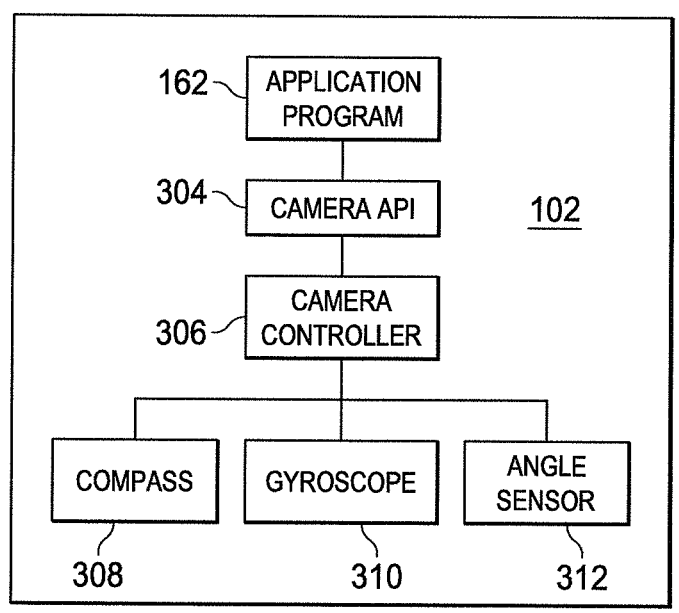
FIG. 3 is a block diagram that illustrates certain components within the electronic device 102 according to embodiments of the present disclosure.

FIG. 3 is a block diagram that illustrates certain components within the electronic device 102 according to embodiments of the present disclosure. The embodiment of the electronic device 102 shown in FIG. 3 is for illustration only. Other embodiments of an electronic device could be used without departing from the scope of this disclosure.

The portion of electronic device 102 depicted in FIG. 3 illustrates additional components and relationships therebetween of the electronic device 102 of FIG. 1. The electronic device 102 is used to capture and create panoramic images. The electronic device 102 includes an application program 162, a camera application programming interface (API) 304, a camera controller 306, a compass 308, a gyroscope 310, and an angle sensor 312.

The angle sensor 312 is associated with the motor 202 and can determine the angle by which the camera is rotated relative to the electronic device 102. The electronic device 102 can be further correlated to the Earth's magnetic north pole with raw magnetometer readings from the compass 308 that detects magnetic forces around the electronic device 102. The camera API 304 uses a single axis to calculate a heading of the electronic device 102, depending on the orientation of the electronic device 102.

The application program 162 receives and is controlled by one or more user inputs. The application program 162 receives one or more inputs from one or more sensors, such as the compass 308, the gyroscope 310, and the angle sensor 312, contained within the electronic device 102. The application program 162 is configured to control the rotation and image recording of a camera, such as the camera 210 of the camera module 208 of FIG. 2, of the electronic device 102 based on the user inputs and the one or more inputs from the one or more sensors contained within the electronic device 102. The application program 162 controls the camera module 208 via the camera API 304. In certain embodiments, the application program 162 can utilize one or more additional APIs to access the sensor inputs.

The camera application programming interface (API) 304 resides between the application program 162 and the camera controller 306. The camera API 304 allows the application program 162 to control the camera module 208 via the camera controller 306. Instructions and commands from the application program 162 are passed to the camera controller 306 via the camera API 304. Feedback and sensor data from the camera controller 306 can be accessed by the application program 162 via the camera API 304.

The camera controller 306 controls the operation of the camera module 208. The camera controller 306 receives instructions and commands from the application program 162 via the camera API 304. The camera controller 306 receives one or more sensor outputs related to one or more of the camera module 208, the motor 202, and the electronic device 102. The sensor outputs include outputs from the compass 308, the gyroscope 310, and the angle sensor 312.

The compass 308 provides sensor information related to a direction of the electronic device 102 based on a magnetic field around the electronic device 102. The sensor information provided by the compass 308 is accessible to the application program 162 via one or more APIs and controllers, including the camera API 304, and the camera controller 306. The sensor information and the associated direction provided by the compass 308 is used to create a panoramic image from a plurality of images recorded at different angles between the camera module 208 and the electronic device 102.

The gyroscope 310 provides sensor information related to a change of direction of the electronic device 102 based on forces measured by the gyroscope 310. The sensor information provided by the gyroscope 310 is accessible to the application program 162 via one or more APIs and controllers, including the camera API 304, and the camera controller 306. The sensor information and the associated change of direction provided by the gyroscope 310 is used to create a panoramic image from a plurality of images recorded at different angles between the camera module 208 and the electronic device 102.

The angle sensor 312 provides sensor information related to an angle of rotation of one or more of the camera module 208 and the motor 202. The sensor information provided by the angle sensor 312 is accessible to the application program 162 via one or more APIs and controllers, including the camera API 304, and the camera controller 306. The sensor information and the associated angle provided by the angle sensor 312 is used to create a panoramic image from a plurality of images recorded at different angles between the camera module 208 and the electronic device 102.

The rotatable camera module 208 is programmable and controllable by the application program 162. The application program 162 can use the camera controller 306 to check a current facing of the camera module 208 via querying the angle sensor 312, the gyroscope 310, and the compass 308.

The application program 162 can control starting and stopping the rotation of the camera module 208, the direction of rotation of the camera module 208, the speed of rotation of the camera module 208, and/or the desired angle and position of the camera module 208. The application program 162 can also cause the camera module 208 to take pictures, record images, save photos, and stitch together panorama images from the taken/recorded/saved images.

FIGS. 4 and 5 illustrate the electronic device 102 with a rotating camera module at an original position and an extended position, respectively, according to embodiments of the present disclosure. The embodiment of the electronic device 102 shown in FIGS. 4 and 5 is for illustration only. Other embodiments of an electronic device could be used without departing from the scope of this disclosure.

The camera module 208, as depicted in FIG. 4, is in an original position and locked in place, which prevents rotation of the camera module 208. The camera module 208, as depicted in FIG. 5, is in an extended position that allows for rotation through 360 degrees, indicated by arrow 502. When in the extended position, the camera module 208 can be automatically rotated to record a plurality of images that are used to create a panoramic image.

FIG. 6 is a block diagram that illustrates certain components within the electronic device 102 according to embodiments of the present disclosure. The embodiment of the electronic device 102 shown in FIG. 6 is for illustration only. Other embodiments of an electronic device could be used without departing from the scope of this disclosure.

The electronic device 102 depicted in FIG. 6 illustrates additional components and relationships therebetween of the electronic device 102 as depicted in FIG. 1. The electronic device 102 includes a driver 602, the camera controller 306, an angle controller 608, a speed controller 606, the motor 202, the gearbox 212, the camera module 208, the camera angle sensor 312, and a scroll back reset 604.

The driver 602 receives inputs from the camera angle sensor 312 and the scroll back reset 604. The driver 602 controls the rotating of the camera of the camera module 208 via the angle controller 608 and the speed controller 606. The driver 602 drives the camera controller 306, which includes the angle controller 608 and the speed controller 606, to cause rotation of the camera module 208 based on instructions and commands received from the application program 162.

The camera controller 306 includes the angle controller 608. The angle controller 608 controls the angle of the camera module 208 with respect to the electronic device 102 by sending one or more electrical signals to the motor 202.

The camera controller 306 includes the speed controller 606. The speed controller 606 controls the speed of the rotation of the camera module 208 with respect to the electronic device 102 by sending one or more electrical signals to the motor 202.

The motor 202 receives inputs from the angle controller 608 and the speed controller 606. Based on the inputs from the angle controller 608 and the speed controller 606, the motor 202 outputs a torque to the gearbox 212 that rotates the camera module 208.

The gearbox 212 is connected to a shaft of the motor 202 to receive torque from the motor 202. The gearbox 212 modifies speed, direction, and torque from the motor 202 to rotate the camera module 208.

The camera module 208 is coupled to the gearbox 212 via the extendable shaft 206 that transfers torque from the motor 202. As the camera module 208 rotates, an angle between the camera module 208 and the electronic device 102 is detected by the angle sensor 312.

The angle sensor 312 detects the angle between the camera module 208 and the electronic device 102. The angle measured by the angle sensor 312 is compared to a threshold by the scroll back reset 604. The angle measured by the angle sensor 312 is output to the driver 602 so that the driver 602 can control rotation of the camera module 208 based on the angle measured by the angle sensor 312.

The scroll back reset 604 compares the angle measured by the angle sensor 312 to a selected threshold. When the measured angle meets the threshold, the scroll back reset 604 indicates to the driver 602 that a rotation has been completed and to scroll back and reset the camera module 208 to an initial position. For example, when a 270 degree panoramic image is selected to be created, the scroll back reset 604 compares the angle measured by the angle sensor 312 against a value of 270 degrees.

Figure 7:
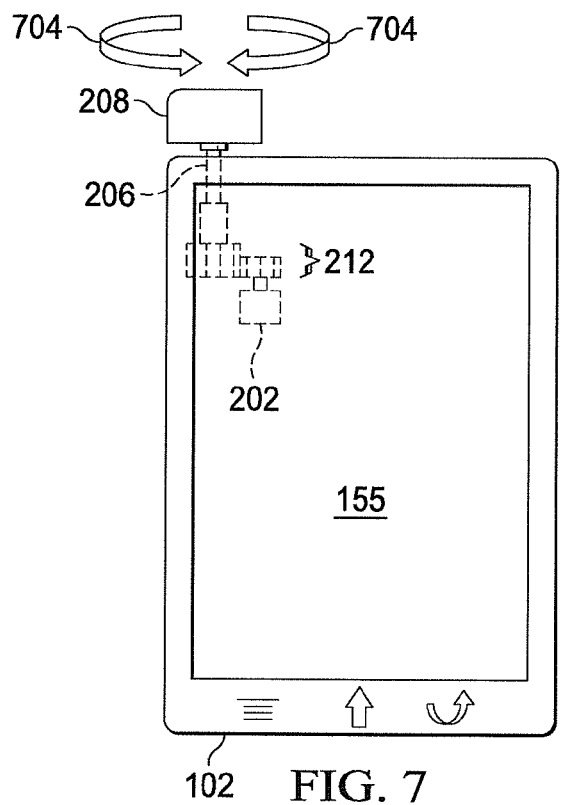
FIGS. 7 and 8 illustrate an electronic device with a rotating camera module at an extended position and an original position, respectively, according to embodiments of the present disclosure.
Figure 8:
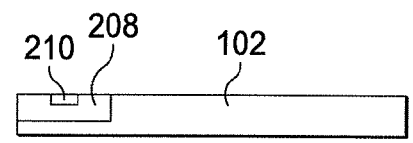

FIGS. 7 and 8 illustrate the electronic device 102 with a rotating camera module at an extended position and an original position, respectively, according to embodiments of the present disclosure. The embodiment of the electronic device 102 shown in FIGS. 7 and 8 is for illustration only. Other embodiments of an electronic device could be used without departing from the scope of this disclosure.

The camera module 208 is placed on a corner and upper side of the electronic device 102 and can rotate 360 degrees when in the extended position, as indicated by arrows 704. The output of the motor 202 is used as the input of the gearbox 212 and controls the speed at which one or more gears of the gearbox 212 rotate. The angle at which the camera module 208 rotates is controlled by a driver. The driver controls the motor 202, which is external and is connected to an input shaft of the gearbox 212. The camera module 208 rotates when the driver is powered so that the shaft of the motor rotates causing the output of the gearbox 212 to rotate the camera module 208. The output speed and torque of the camera module 208 are dependent on the configuration of the gearbox 212 and a speed controller. The angle of rotation is controlled by an angle controller. The angle sensor is attached to the camera module 208. Once the camera module 208 finishes the photo/video taking, the angle sensor detects the position of the camera and allows the camera controller to control the camera to either continue or restart rotation.

Figure 9:
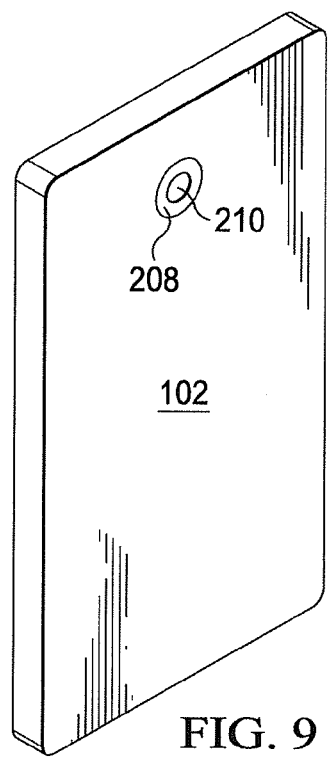
FIGS. 9 and 10 illustrate an electronic device with a rotating camera module at an original position and an extended position, respectively, according to embodiments of the present disclosure.
Figure 10:
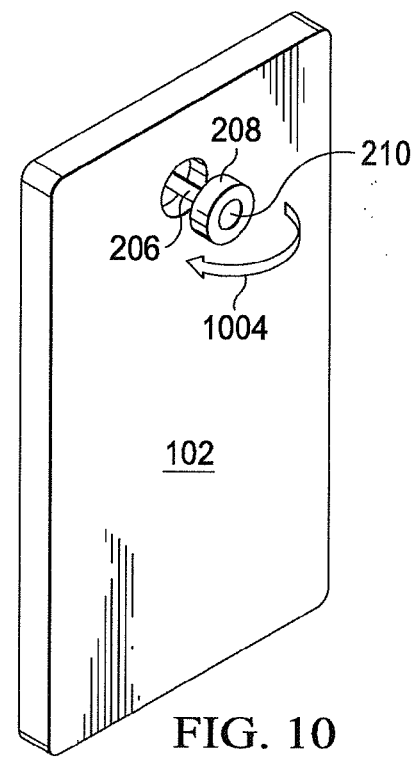

FIGS. 9 and 10 illustrate the electronic device 102 with a rotating camera module at an original position and an extended position, respectively, according to embodiments of the present disclosure. The embodiment of the electronic device 102 shown in FIGS. 9 and 10 is for illustration only. Other embodiments of an electronic device could be used without departing from the scope of this disclosure.

The camera module 208, as depicted in FIG. 9, is in an original position and locked in place, which prevents rotation of the camera module 208. The camera module 208, as depicted in FIG. 10, is in an extended position that allows for rotation through 180 or more degrees, indicated by arrow 1004. When in the extended position, the camera module 208 can be automatically rotated to record a plurality of images that are used to create a panoramic image.

Figure 11:
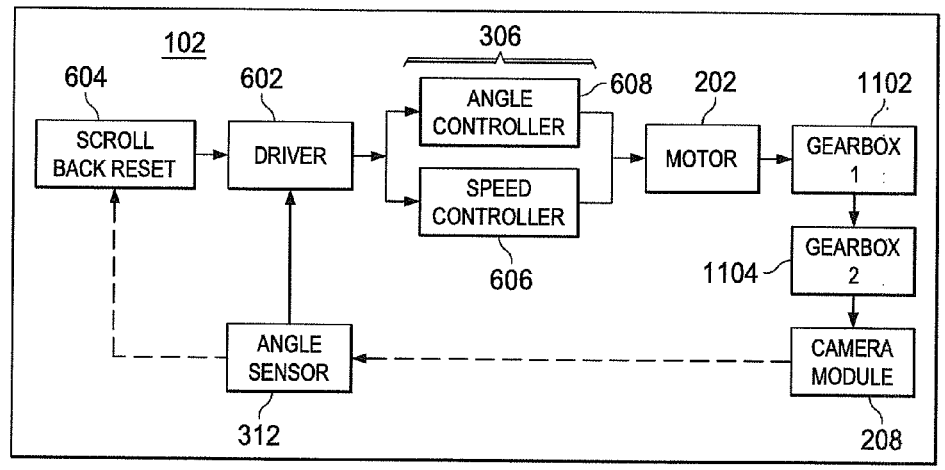
FIG. 11 is a block diagram that illustrates certain components within an electronic device according to embodiments of the present disclosure.

FIG. 11 is a block diagram that illustrates certain components within the electronic device 102 according to embodiments of the present disclosure. The embodiment of the electronic device 102 shown in FIG. 11 is for illustration only. Other embodiments of an electronic device could be used without departing from the scope of this disclosure.

In addition to features previously described, electronic device 102 includes a first gearbox 1102 and a second gearbox 1104. The first gearbox 1102 is coupled to the motor 202 and is coupled the second gearbox 1104 via an extendable shaft, such as the extendable shaft 206 of FIG. 2. The first gearbox 1102 receives torque from and is driven by the motor 202. The first gearbox 1102 transfers torque to the second gearbox 1104 via the extendable shaft 206. The first gearbox 1102 converts an axis of rotation of the torque from the motor 202 to an axis of rotation of the extendable shaft 206.

The second gearbox 1104 is coupled to the first gearbox 1102 via the extendable shaft 206 and the second gearbox 1104 is coupled to the camera module 208. The second gearbox 1104 receives torque from and is driven by the first gearbox 1102 via the extendable shaft 206. The second gearbox 1104 transfers torque to the camera module 208 to rotate the camera module 208 under the control of camera controller 306 and driver 602. The second gearbox 1104 converts an axis of rotation of the torque from the extendable shaft 206 to an axis of rotation of the camera module 208.

Figure 12:
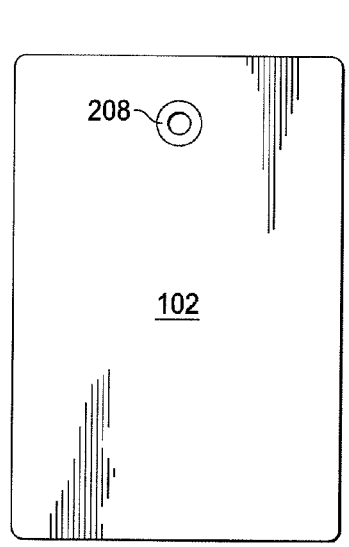
FIGS. 12 and 13 illustrate an electronic device with a rotating camera module at an original position and an extended position, respectively, according to embodiments of the present disclosure.
Figure 13:
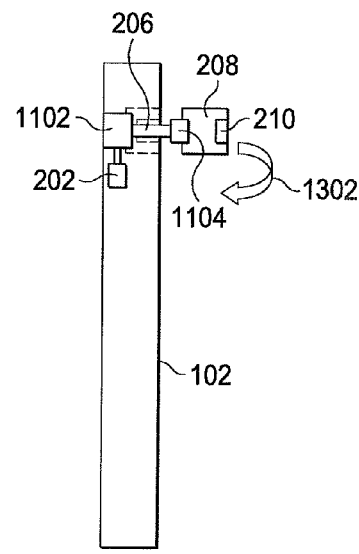

FIGS. 12 and 13 illustrate the electronic device 102 with a rotating camera module at an original position and an extended position, respectively, according to embodiments of the present disclosure. The embodiment of the electronic device 102 shown in FIGS. 12 and 13 is for illustration only. Other embodiments of an electronic device could be used without departing from the scope of this disclosure.

The output of the motor 202 is used as the input of the first gearbox 1102 and controls the speed at which the first gearbox 1102 rotates. The driver 602 controls the motor 202, which is connected as the input shaft of the first gearbox 1102. The torque generated by the motor 202 is transferred to the extendable shaft 206 and to the camera module 208 via a pair of bevel gears in the first gearbox 1102. The torque of the extendable shaft 206 is transferred to the camera module 208 and the axis of rotation of the torque is changed through a second pair of bevel gears within the second gearbox 1104. The camera module 208 rotates when the driver 602 is powered. A shaft of the motor 202 rotates causing the camera module 208 to rotate via the first gearbox 1102 and the second gearbox 1104. The output rotational speed and torque of the camera module 208 is dependent on the configuration of the first gearbox 1102, the second gearbox 1104, and the speed controller 606. The rotation angle of the camera module 208 with respect to the electronic device 102 is controlled by the angle controller 608. The angle sensor 312 is attached to the camera module 208. Once the camera module 208 finishes the photo/video taking, the angle sensor 312 will detect the position of the camera module 208 and control the camera module 208 to either continue or restart recording images/photos/video.

Figure 14:
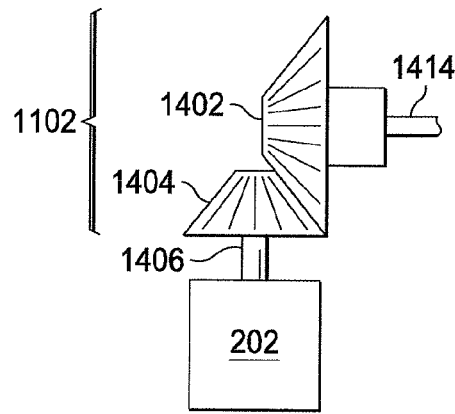
FIG. 14 illustrates a first gearbox of an electronic device according to embodiments of the present disclosure.

FIG. 14 illustrates the first gearbox 1102 of the electronic device 102 according to embodiments of the present disclosure. The embodiment of the electronic device 102 shown in FIG. 14 is for illustration only. Other embodiments of an electronic device could be used without departing from the scope of this disclosure.

In addition to features previously described, electronic device 102 includes a first shaft 1406, a first gear 1404, a second gear 1402, and a second shaft 1414. The first shaft 1406 couples the motor 202 to the first gear 1404 so that a rotation of the motor 202 creates a corresponding rotation of the first gear 1404 via the first shaft 1406. The first shaft 1406 transfers torque received from the motor 202 to the first gear 1404. The first shaft 1406 operates to connect the motor 202 and the first gear 1404.

The first gear 1404 of the first gearbox 1102 couples the first shaft 1406 to the second gear 1402 so that a rotation of the motor 202 creates a corresponding rotation of the second gear 1404 via the first shaft 1406 and the first gear 1404. The first gear 1404 transfers torque received from the first shaft 1406 to the second gear 1402.

The second gear 1402 of the first gearbox 1102 couples the first gear 1404 to the extendable shaft 206 so that a rotation of the motor 202 creates a corresponding rotation of the extendable shaft 206 via the first shaft 1406, the first gear 1404, and the second gear 1402. The second gear 1402 transfers torque received from the first gear 1404 to the extendable shaft 206. In conjunction, the first gear 1404 and the second gear 1402 operate to change a direction or axis of rotation of the torque supplied by the motor 202 to a direction that is suitable for the second shaft 1414. The first gear 1404 and the second gear 1402 operate in conjunction to transfer torque from the motor 202 to the second shaft 1414.

The second shaft 1414 couples the second gear 1402 to a third gear, such as the third gear 1508 so that rotation of the motor 202 creates a corresponding rotation of the third gear 1508 via the first shaft 1406, the first gear 1404, the second gear 1402, and the second shaft 1414. The second shaft 1414 transfers torque received from the second gear 1402 to the third gear 1508. The second shaft 1414 operates to hold and rotate the second gear 1402, which is within the first gearbox 1102, and the third gear 1508, which is within the second gearbox 1104. In particular embodiments, the second shaft 1414 is housed within the extendable shaft 206.

Figure 15:
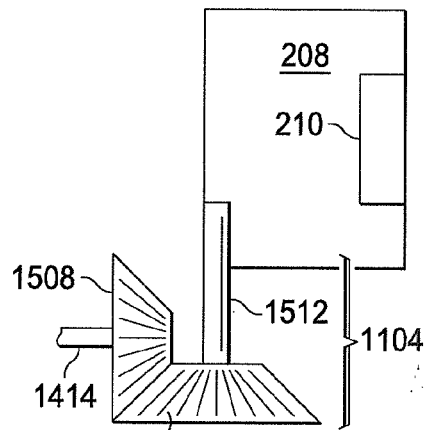
FIG. 15 illustrates a second gearbox of an electronic device according to embodiments of the present disclosure.

FIG. 15 illustrates the second gearbox 1104 of the electronic device 102 according to embodiments of the present disclosure. The embodiment of the electronic device 102 shown in FIG. 15 is for illustration only. Other embodiments of an electronic device could be used without departing from the scope of this disclosure.

In addition to features previously described, electronic device 102 includes a third gear 1508, a fourth gear 1510, and a third shaft 1512. The third gear 1508 is within the second gearbox 1104 and couples the second shaft 1414 to the fourth gear 1510 so that a rotation of the motor 202 creates a corresponding rotation of the fourth gear 1510 via the third gear 1508, the second shaft 1414, the second gear 1402, the first gear 1404, and the first shaft 1406. The third gear 1508 transfers torque received from the second shaft 1414 to the fourth gear 1510.

The fourth gear 1510 is within the second gearbox 1104 and couples the third gear 1508 to the third shaft 1512 so that a rotation of the motor 202 creates a corresponding rotation of the third shaft 1512 via the fourth gear 1510, the third gear 1508, the second shaft 1414, the second gear 1402, the first gear 1404, and the first shaft 1406. The fourth gear 1510 transfers torque received from the third gear 1508 to the third shaft 1512. The third gear 1508 and the fourth gear 1510 operate in conjunction to transfer torque from the second shaft 1414 to the third shaft 1512.

The third shaft 1512 couples the fourth gear 1510 to the camera module 208 so that a rotation of the motor 202 creates a corresponding rotation of the camera module 208 via the third shaft 1512, the fourth gear 1510, the third gear 1508, the second shaft 1414, the second gear 1402, the first gear 1404, and the first shaft 1406. The third shaft 1512 transfers torque received from the fourth gear 1510 to the camera module 208. The third shaft 1512 operates to rotate the camera module 208.

Figure 16:
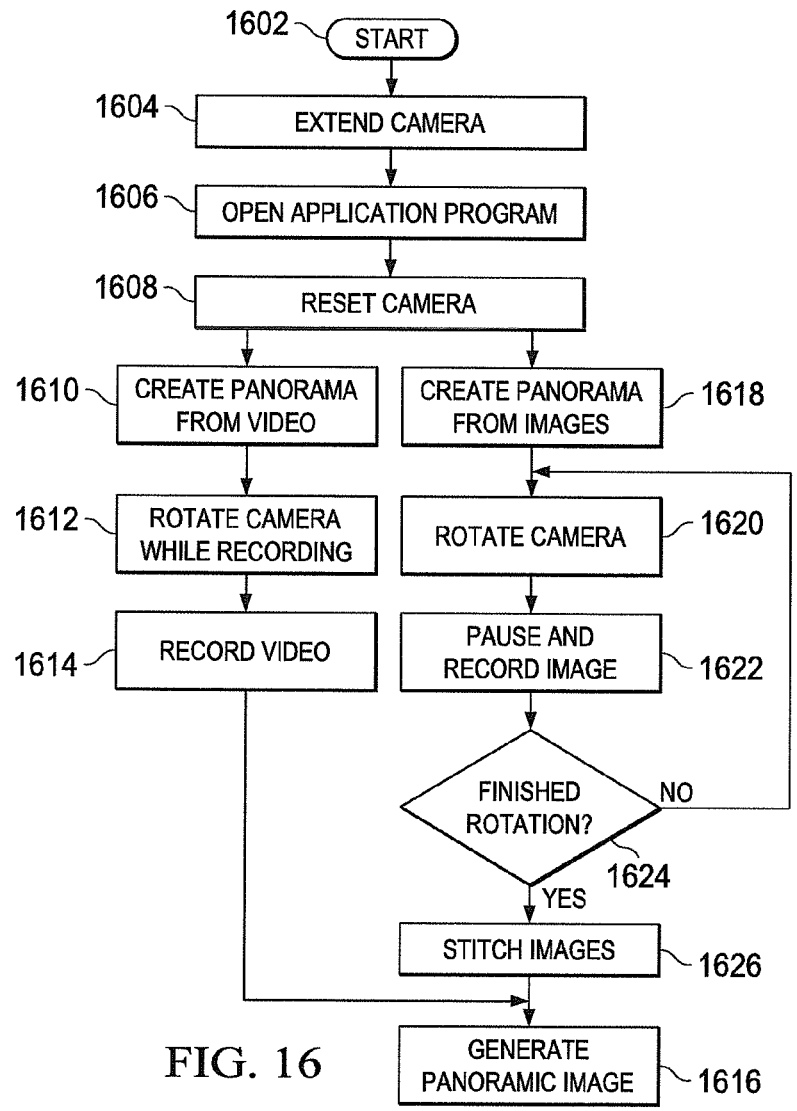
FIG. 16 illustrates a flowchart for creating panoramic images via a rotating camera.

FIG. 16 illustrates a flowchart for creating panoramic images via a rotating camera. While the flowchart depicts a series of sequential steps, the scope of the present disclosure is not limited to the sequence depicted and described. The steps can be performed in a different order, with additional, intervening, or intermediate steps, and without steps that have been depicted. The process depicted in the example is implemented by any suitably configured electronic device, such as the electronic device 102 of FIG. 1.

At step 1602, the electronic device 102 starts up and is initialized. The starting and initialization can be from a power off state, a sleep state, or a lock state of the electronic device 102, which do not allow recording and creating panoramic images. The electronic device 102 is started and initialized before the camera module 208 is extended at step 1604.

At step 1604, the camera module 208 is extended away from the electronic device 102 via the extendable shaft 206.

The extending can be done manually by a user or automatically via one or more actuators, springs, or motors. For example, the user can press a button that releases energy stored in a spring to extend the camera module 208 up or out from the electronic device 102. The camera module 208 is extended before the application program 162 is opened and after the electronic device is started.

At step 1606, the application program 162 is opened or activated. The application program 162 is opened or activated in response to one or more of (1) extending of the camera module 208 away from the electronic device 102 and (2) one or more user inputs received by the application program 162 of the electronic device 102. The one or more user inputs are received via one or more of the keypad 150 and the display 155. The application program 162 is opened before the camera module 208 is reset and after the camera module 208 is extended from the electronic device 102. In particular embodiments, the application program 162 is opened before the camera module 208 is extended and the application program 162 controls the extending of the camera module 208 via one or more motors or actuators.

At step 1608, the camera module 208 is reset. The camera module 208 is reset by setting the angle of the camera module 208 with respect to the electronic device 102 to an initial angle. The camera module 208 is reset before a panoramic image is created and after the application program is opened.

At step 1610, a user selects to create a panoramic image via video recorded by the electronic device 102. The user makes the selection via one or more of a graphical user interface (GUI) of the application program 162, the keypad 150, and the display 155. The selection is made before the camera module 208 begins to rotate and after the angle of the camera module 208 with respect to the electronic device 102 is reset.

At step 1612, the camera module 208 rotates while recording video. The rotating and the recording of the camera module 208 are controlled by the application program 162. The rotating and the recording of the camera module 208 is after the user selects to create the panoramic image using video.

At step 1614, the camera module 208 continues to rotate and record. The camera module 208 continues to rotate and record until the camera module 208 has rotated a selected number of degrees, e.g., 90, 180, 270, 360, and so on. Each frame or image of the recorded video is recorded at and associated with an angle between the camera module 208 and a direction of the electronic device 102. The recording of video, and the images thereof, is continuous with the rotating of the camera module 208. The direction of the electronic device 102 is determined via one or more sensors, such as the compass 308, the gyroscope 310, and the angle sensor 312. The camera module 208 finishes rotating and recording before generating the panoramic image from the recorded video.

At step 1618, a user selects to create a panoramic image via a plurality of images. The user makes the selection via one or more of a GUI of the application program 162, the keypad 150, and the display 155. The selection is made before the camera module 208 begins to rotate and after the angle of the camera module 208 with respect to the electronic device 102 is reset.

At step 1620, the camera module 208 rotates. The rotating of the camera module 208 is controlled by the application program 162. The camera module 208 rotates a selected number of degrees before pausing to record an image and after the user selects to create the panoramic image using a plurality of images.

At step 1622, the camera module 208 pauses and records an image that can be used to generate the panoramic image. The rotating of the camera module 208 pauses during the recording of each of the plurality of images. Each image of the plurality of images is recorded at and associated with an angle between the camera module 208 and a direction of the electronic device 102. The direction of the electronic device 102 is determined via one or more sensors, such as the compass 308, the gyroscope 310, and the angle sensor 312. The camera module 208 records the image before determining if a selected amount of rotation required for the panoramic image has been completed and after the camera module 208 has rotated a portion of the selected amount of rotation.

At step 1624, the electronic device 102 determines, via one or more of the application program 162 and the camera controller 306, whether the selected amount of rotation required for the panoramic image has been completed. If the selected amount of rotation has not been finished, the process proceeds to step 1620. If the selected amount of rotation has been finished, the process proceeds to step 1626. The determination of whether the selected amount of rotation has been completed is before the plurality of images are stitched together and after the images have been recorded.

At step 1626, the images of the plurality of images are stitched together. The images of the plurality of images include overlapping fields of view that allow for the plurality of images to be combined or stitched together. Features between successive images of the plurality of images are extracted and matched to stitch the images together. As a part of the process, certain ones of the images are selected to maximize the feature matching and to improve the quality of the panoramic image. Stitching the plurality of images together is before generating the panoramic image and after the determination of whether the selected amount of rotation has been completed. In particular embodiments, stitching the plurality of images together can be after the recording of video of step 1614 so that frames or images of the recorded video are selected and stitched together.

At step 1616, the panoramic image is generated. The panoramic image is generated from and is after the video is recorded at step 1614 or the images of the plurality of images are recorded via repetitions of step 1622. The panoramic image is generated after the images of the plurality of images are stitched together when the user selects to create the panoramic image via the plurality of images.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of generating a panoramic image in an application on a portable electronic device, the method comprising:
   receiving a user selection for a selected threshold angle of a plurality of threshold angles for creating the panoramic image using a plurality of overlapping images obtained from a respective plurality of rotational viewing angles;
   determining an initial heading of the portable electronic device responsive to signals provided by one or more of a compass or a gyroscope;

rotating a camera of the portable electronic device about a vertical axis with respect to the portable electronic device via a motor of the portable electronic device, the camera starting from an initial rotational position;
monitoring a current heading of the portable electronic device responsive to signals received from the one or more of the compass or gyroscope;
monitoring a current angle of rotation of the camera about the vertical axis responsive to signals provided by an angle sensor;
determining a current facing of the camera based on the initial heading of the portable electronic device, the current heading of the portable electronic device, and the current angle of rotation of the camera;
recording the respective plurality of overlapping images at the plurality of rotational viewing angles, relative to the initial heading, wherein the recording comprises pausing the rotation of the camera, when the current facing of the camera corresponds to each of the plurality of rotational viewing angles;
comparing the current facing of the camera to the selected threshold angle and rotating the camera back to the initial rotational position, indicating completion of image recording, when the facing of the camera equals or exceeds the selected threshold angle; and
creating the panoramic image from the plurality of recorded overlapping images.

2. The method in accordance claim 1 further comprising:
extending the camera away from the portable electronic device to allow for the rotating of the camera; and
activating an application programmed to control the rotating and the recording in accordance with the user selection, an input from the angle sensor and one or more of the signals provided by the at least one of the compass or gyroscope of the portable electronic device in response to the extending of the camera.

3. The method in accordance with claim 1, further comprising:
controlling, via a motor driver, the rotating of the camera via an angle controller and a speed controller.

4. The method in accordance with claim 1, wherein the motor rotates the camera via a gearbox, and the gearbox is coupled to the camera via a shaft.

5. The method in accordance with claim 1, wherein the plurality of thresholds include:
120 degrees, 180 degrees, 270 degrees or 360 degrees.

6. The method in accordance with claim 1, further comprising:
automatically selecting one or more of the plurality of overlapping images to maximize feature matching and to improve a quality of the panoramic image.

7. An apparatus for creating a panoramic image, the apparatus comprising:
a camera;
a motor configured to rotate the camera about a vertical axis of the apparatus;
an angle sensor coupled to the motor and configured to provide signals indicating a rotational angle of the camera about the vertical axis relative to an initial rotational position;
at least one of a compass and a gyroscope configured to provide signals indicating a heading of the apparatus;
a scroll back reset coupled to the camera and the motor through a motor driver; and
one or more processors configured to run an application, the application configuring the one or more processors to:
generate a prompt to a user to select creating the panoramic image using a plurality of overlapping images corresponding to a plurality of rotational viewing angles;
receive a response from the user regarding the prompt;
determine an initial heading of the apparatus using the signals provided by the at least one of the compass and gyroscope;
control the motor to rotate the camera;
monitor a current rotational angle of the camera about the vertical axis relative to the initial rotational position using the signals provided by the angle sensor;
monitor a current heading of the apparatus using the signals provided by the at least one of the compass and gyroscope;
determine a current facing of the camera based on the initial heading of the apparatus, the current heading of the apparatus, and the current rotational angle of the camera;
record each of the plurality of overlapping images when the current facing of the camera corresponds to each of the plurality of rotational viewing angles, respectively;
compare the current facing of the camera with a selected threshold angle of a plurality of threshold angles and control the scroll back reset to rotate the camera to the initial rotational position, indicating completion of image recording, when the current facing of the camera equals or exceeds the selected threshold angle; and
stitch the plurality of overlapping images to create the panoramic image.

8. The apparatus in accordance with claim 7, wherein the one or more processors are further configured to activate the application of the apparatus in response to an extending of the camera away from the apparatus to allow for the rotation of the camera.

9. The apparatus in accordance with claim 7, further comprising:
a motor driver configured to control the rotation of the camera via an angle controller and a speed controller.

10. The apparatus in accordance with claim 7, further comprising:
a gearbox connected to the motor and connected to the camera via a shaft.

11. The apparatus in accordance with claim 7, wherein the plurality of threshold angles include: 120 degrees, 180 degrees, 270 degrees, and 360 degrees.

12. The apparatus in accordance with claim 7, wherein the one or more processors are further configured to automatically select one or more of the plurality of overlapping images to maximize feature matching and to improve a quality of the panoramic image.

13. The method in accordance with claim 1, wherein the angle sensor provides sensor information related to an angle of rotation of one or more of the camera and the motor, the compass provides sensor information related to a direction of the portable electronic device in accordance with a magnetic field around the portable electronic device, and the gyroscope provides sensor information related to a change of the direction of the portable electronic device.

14. The method of claim 1 further comprising:
receiving a further user selection for a further selected threshold angle of the plurality of threshold angles for creating the panoramic image using a video recording;
determining a further heading of the portable device responsive to signals provided by the one or more of the compass or gyroscope;

rotating the camera with respect to the portable electronic device via the motor, the camera starting from the initial rotational position;

recording the video recording as the current facing of the camera rotates through a plurality of rotational viewing angles;

comparing the current facing of the camera to the further selected threshold angle and rotating the camera back to the initial rotational position, indicating completion of image recording, when the facing of the camera equals or exceeds the further selected threshold angle; and creating the panoramic image from the video recording.

15. The apparatus in according to claim 10 further comprising:

a first gearbox connected to a first shaft of the motor and including a first pair of bevel gears configured to drive rotation of a second shaft oriented perpendicular to the first shaft of the motor; and a second gearbox connected to the second shaft and including a second pair of bevel gears configured to drive rotation of the shaft of the camera, the shaft of the camera being oriented perpendicular to the second shaft, wherein the second gearbox is configured to drive the shaft of the camera to rotate the camera with respect to the apparatus.

* * * * *

UNITED STATES PATENT AND TRADEMARK OFFICE
CERTIFICATE OF CORRECTION

PATENT NO. : 10,021,296 B2  
APPLICATION NO. : 14/145709  
DATED : July 10, 2018  
INVENTOR(S) : Fan et al.

Page 1 of 1

It is certified that error appears in the above-identified patent and that said Letters Patent is hereby corrected as shown below:

On the Title Page

In item (71), in "Applicant", in Column 1, Line 1, after "Technologies", insert --,--

In the Specification

In Column 9, Line 55, delete "1404" and insert --1402-- therefor

In the Claims

In Column 13, Line 28, in Claim 2, delete "accordance claim 1" and insert --accordance with claim 1,-- therefor In Column 14, Line 61, in Claim 14, after "claim 1", insert --,--

In Column 15, Line 14, in Claim 15, after "claim 10", insert --,--

Signed and Sealed this  
Twenty-eighth Day of May, 2019

Andrei Iancu  
*Director of the United States Patent and Trademark Office*